(12) United States Patent
Brooks

(10) Patent No.: US 7,366,212 B2
(45) Date of Patent: Apr. 29, 2008

(54) ALTERABLE FREQUENCY COHERENT LIGHT GENERATOR

(76) Inventor: Christopher Raphael Brooks, 11060 Hwy 87, La Vernia, TX (US) 78121

( * ) Notice: Subject to any disclaimer, the term of this patent is extended or adjusted under 35 U.S.C. 154(b) by 313 days.

(21) Appl. No.: 10/983,285

(22) Filed: Nov. 8, 2004

(65) Prior Publication Data

US 2006/0098702 A1    May 11, 2006

(51) Int. Cl.
*H01S 3/00* (2006.01)
(52) U.S. Cl. .................. 372/38.04; 372/38.05
(58) Field of Classification Search ... 372/38.04–38.05
See application file for complete search history.

(56) References Cited

U.S. PATENT DOCUMENTS

| | | | | |
|---|---|---|---|---|
| 2,386,807 | A | * | 10/1945 | Leslie .................... 126/110 R |
| 3,054,933 | A | * | 9/1962 | Meykar ...................... 361/811 |
| 3,281,712 | A | * | 10/1966 | Koester ........................ 372/15 |
| 3,408,131 | A | * | 10/1968 | Kapany ........................ 385/39 |
| 3,422,361 | A | * | 1/1969 | Petts .......................... 327/276 |
| 3,792,323 | A | * | 2/1974 | Stockman ................ 361/275.1 |
| 3,868,621 | A | * | 2/1975 | Kitamura et al. ........... 338/180 |
| 4,396,857 | A | * | 8/1983 | Danko ......................... 313/634 |
| 4,563,567 | A | * | 1/1986 | Geffroy et al. ......... 219/121.78 |
| 4,594,641 | A | * | 6/1986 | Hernandez ................ 361/306.2 |
| 4,928,248 | A | * | 5/1990 | Takahashi et al. ........ 372/38.02 |
| 5,048,033 | A | * | 9/1991 | Donahue et al. ......... 372/38.04 |

FOREIGN PATENT DOCUMENTS

FR    2456403 A  *  1/1981

\* cited by examiner

*Primary Examiner*—Minsun Oh Harvey
*Assistant Examiner*—Patrick Stafford
(74) *Attorney, Agent, or Firm*—Kammer Browning PLLC

(57) ABSTRACT

An alterable frequency coherent light generator for the generation of highly energy efficient coherent light, by means of a power supply connected to a four-lead capacitor, which is connected to a variable resistive device in series with a vacuumed bulb. The direct current being conducted through the circuit is formed into a transverse wave of electrons or electric pulses within the vacuumed bulb by means of four-lead capacitor, variable resistive device, vacuumed bulb, and electric current interaction. The anode of the vacuumed bulb is thoroughly connected to the corners of a thin, square metal plate which has a relief conductive wire connecting from an edge of the thin, square metal plate to the four-lead capacitor. The electric pulses emanating from the vacuumed bulb, resonate the electrons within the thin, square metal plate at a frequency determined by four-lead capacitor, variable resistive device, vacuumed bulb, and electric current interaction. The resonating electrons generate coherent light.

4 Claims, 9 Drawing Sheets

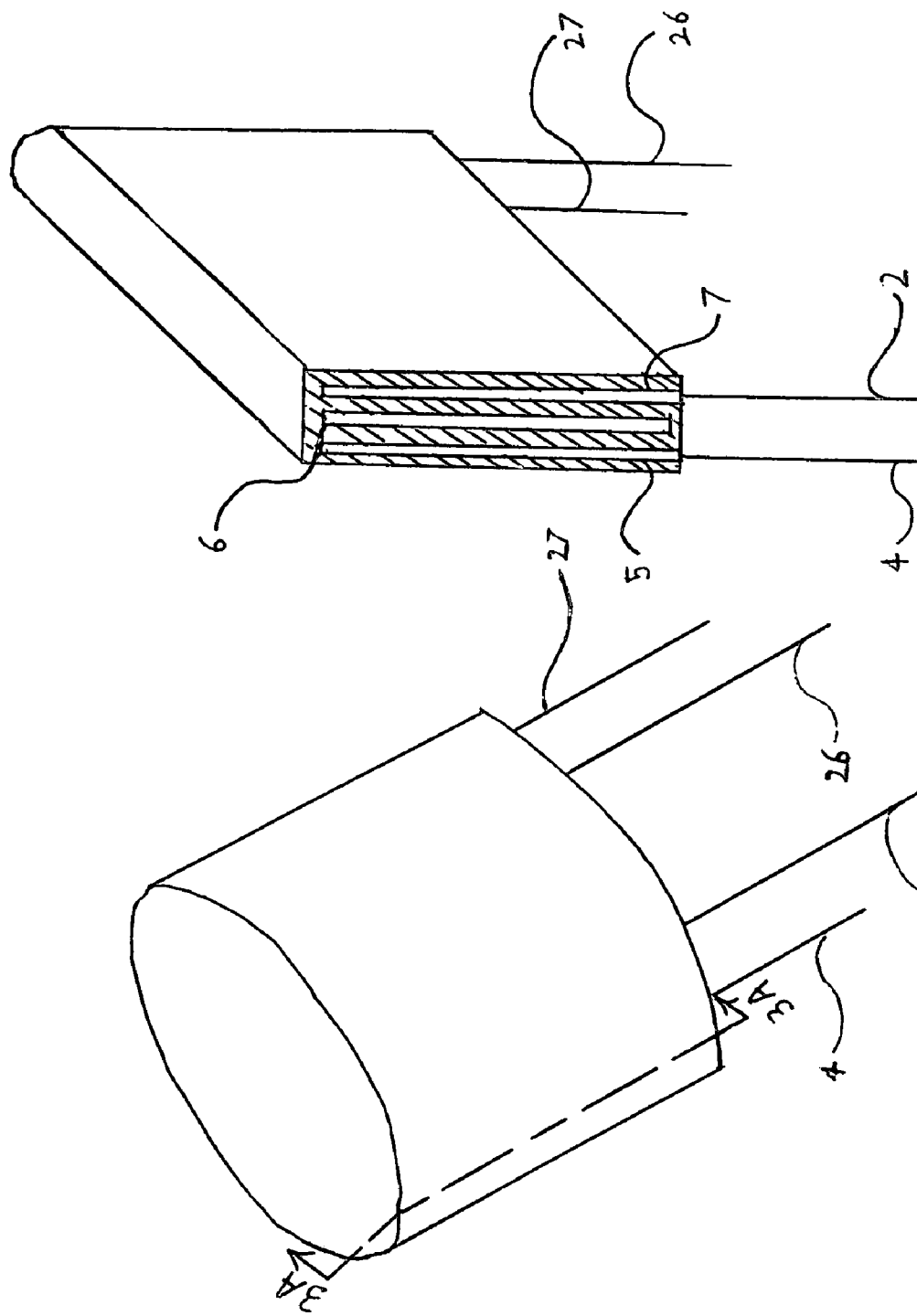

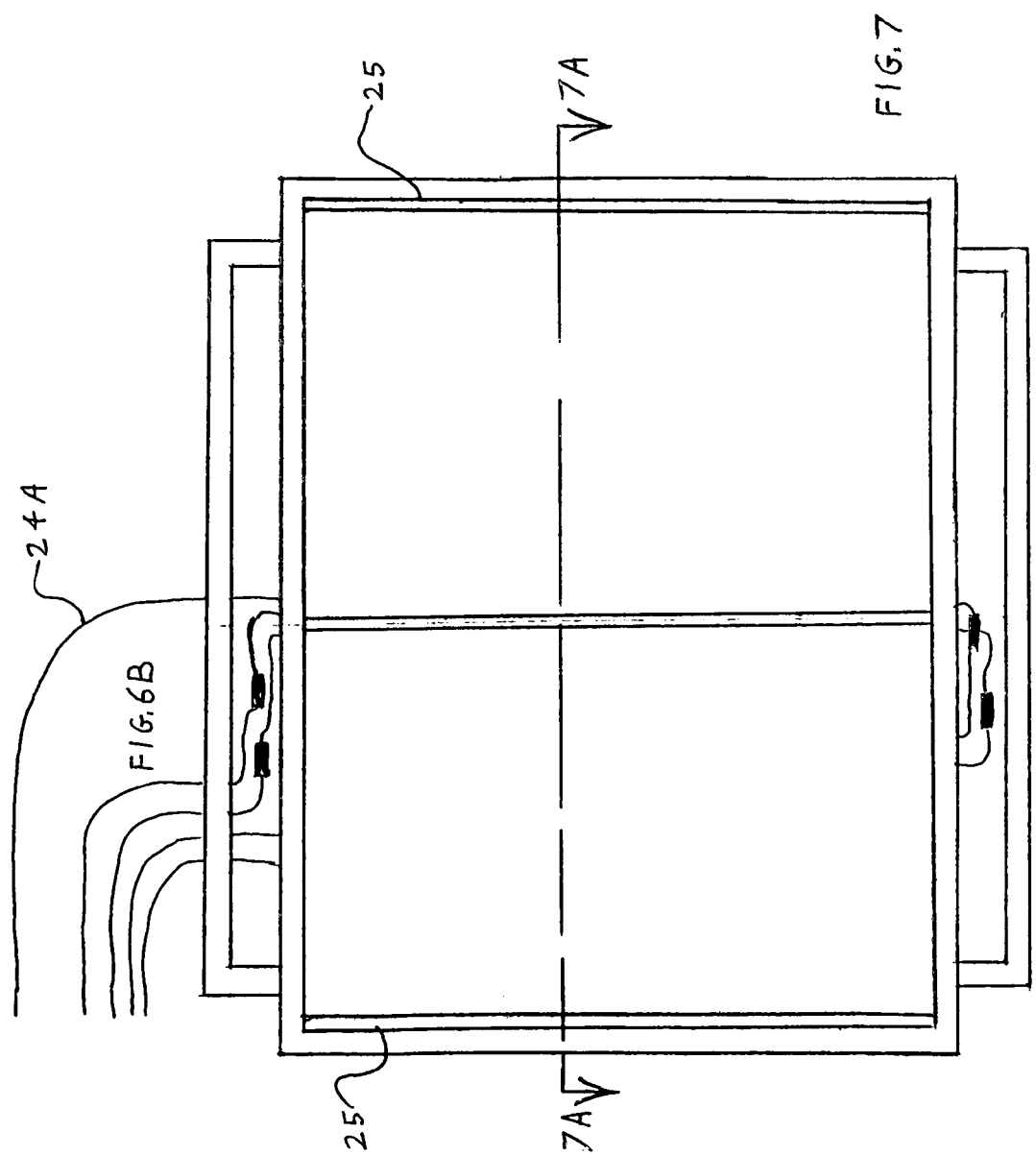

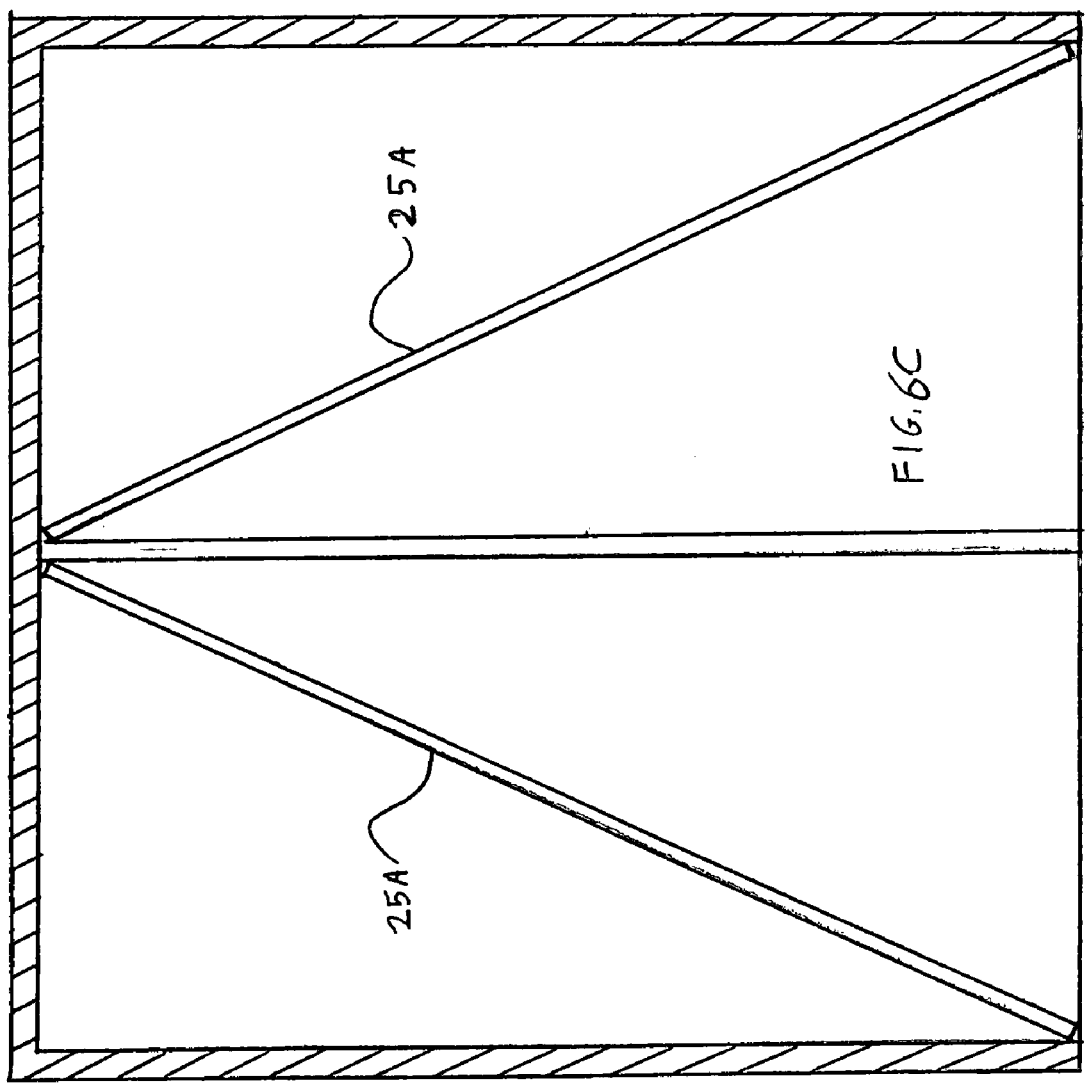

ALTERABLE FREQUENCY COHERENT LIGHT GENERATOR

FIELD OF THE INVENTION

The present invention relates to lasers, specifically to an energy efficient electronic coherent light-generating device.

BACKGROUND OF THE INVENTION

A successful coherent light-emitting device should be designed to efficiently convert energy from an electric source by means of an active medium to the desired frequency of coherent light.

In order to meet the design criteria of a successful coherent light-emitting device various lasers have been developed. For example, The Ruby Laser, developed by Maiman, U.S. Pat. No. 3,353,115. Is a device, which incorporates a flash lamp, wrapped around a synthetic ruby with a mirror on each end. The ruby laser emitted light in short, intense pulses of a single wavelength.

U.S. Pat. No. 2,929,922 issued to Townes and Schawlow describes a gas laser, which employs a glass tube, filled with a gas, carbon dioxide, neon, helium or both. An electrical power supply charges electrodes, which electrifies the gas, causing spontaneous emissions throughout the medium. A population inversion occurs when spontaneous emissions are trapped between a rear mirror and an output mirror. The population inversion is a coherent beam of light, which immerges at the output mirror. The sealed gas tube requires periodic replacement of the laser gas because contaminants accumulate and gradually degrade laser action.

A Symmetrically Conductive Device and Method of making the same is U.S. Pat. No. 2,994,018 issued to Hall for a semiconductor laser device and a manufacturing process for the same. The semiconductor laser creates light when electrons from an electrical source travel through the N-type layer, across the junction layer to the P-type layer, making a circuit. Light is generated from the re-combination of electron-hole pairs at the forward-biased junction layer. Cleaving a wafer into chips exposing the junction layer makes the laser. The cleaving process forms facets. The facets reflect only about 30% of the light back into the junction layer. However, enough light is reflected back into the junction layer to allow stimulated emissions for a population inversion. The laser is packaged in a way, which allows the beam to emerge from only one end of the laser.

The output of coherent light is very inefficient in a semiconductor laser and much energy in the drive current is lost as heat.

Stimulated Emission of Radiation in Periodically Deflected Electron Beam is U.S. Pat. No. 3,822,410 issued to Madey. The device is a tunable generator or amplifier of coherent radiation in the infrared, optical, ultra-violet and x-ray regions. A relativistic electron beam is periodically deflected by a transverse magnetic field defined by a linear array of adjacent magnets having opposing polarities. Each time the electron beam is deflected by a change in polarity, it emits a burst of radiation. A mirror at one end of the linear cavity and a partially reflective mirror at the other end of the cavity reflect the burst of radiation to create a coherent beam of radiation.

The electron accelerator used to generate the electron beam can be rather bulky as respects to the output in wattage of coherent radiation. The linear array of magnets is also quite large and heavy. The efficiency of the tunable generator of coherent radiation is roughly from 20 to 50 percent.

The Free-Electron Amplifier device with Electro-magnetic radiation Delay Element is U.S. Pat. No. 4,529,942 issued to Patel and Shaw is a free-electron laser consisting of a rather large external accelerator, which injects an electron beam a distance to an injection magnet, which aligns the beam to the optical axis of the laser cavity. An extraction magnet guides the electron beam away from the laser cavity. The laser cavity is the source of a helical magnetic field comprising of several relatively large electrical conductors fastened to a support cylinder, which serves to impart transversal acceleration to the electrons of the beam. Wire meshes insides the support cylinder form a resonant filter, which serves as a delay element. A semi-transparent mirror is at one end of the laser cavity and a mirror is at the other end. The device operation results in a modicum of coherent radiation being emitted through the semi-transparent mirror relative to the device size.

SUMMARY OF THE INVENTION

It is therefore an object of the present invention to provide energy efficiency in the conversion of electrical energy to coherent light It is another object of the present invention to provide sufficient amounts of coherent light with less contraptional material and weight. In order to achieve the objectives of less contraptional material and energy efficiency in the generation of coherent light, the present invention must have an energy source such as a power supply, a capacitor, a variable resister, a vacuumed bulb with a closely aligned cathode and anode, and a metal plate for the gyrating electrons to emit coherent light.

The advantages of the present invention would be an energy efficient cutting tool such as a surgical laser or a welding device as for welding metals.

Another advantage of the present invention would be improved energy efficiency in the laser mechanism of a deuterium pellet fusion reaction.

In addition, it would be advantageous of the present invention with improved energy efficiency in the production of coherent light or heat to be the heating element of a waste or pollution burning process, whereas the waste or pollution is broken down with intense heat to basic elements for recyclization.

BRIEF DESCRIPTION OF THE DRAWINGS

FIG. 3 is a perspective representation of a four-lead capacitor.

FIG. 3A is a sectioned view of a four-lead capacitor.

FIG. 6A-6C are perspective and topographical representations of a thin metal square or antenna with four conductive wires adjoined at the corners of the antenna.

FIG. 7 is a frontal view of a hollow cube of stiff construction.

DETAILED DESCRIPTION OF THE PREFERRED EMBODIMENTS

The present invention will now be described more fully hereinafter with reference to the accompanying drawings, in which a preferred embodiment of the invention is shown. The accompanying drawings are a basic description of the present invention and should not be construed as limited to the embodiments set forth herein.

Figure 1:
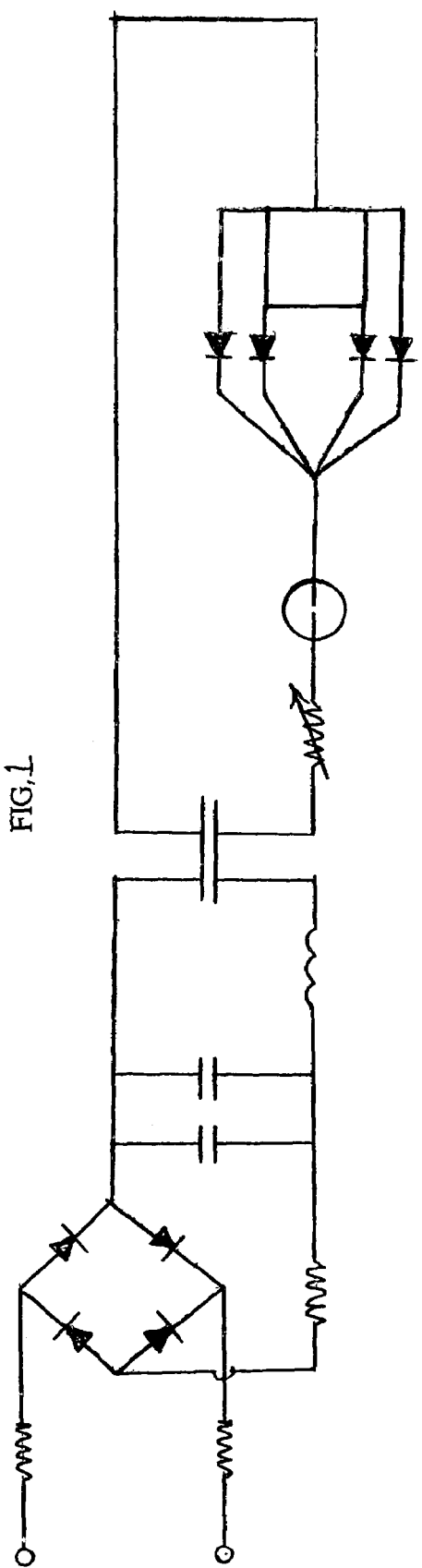
FIG. 1 is a schematic diagram of the present invention.
Figure 2:
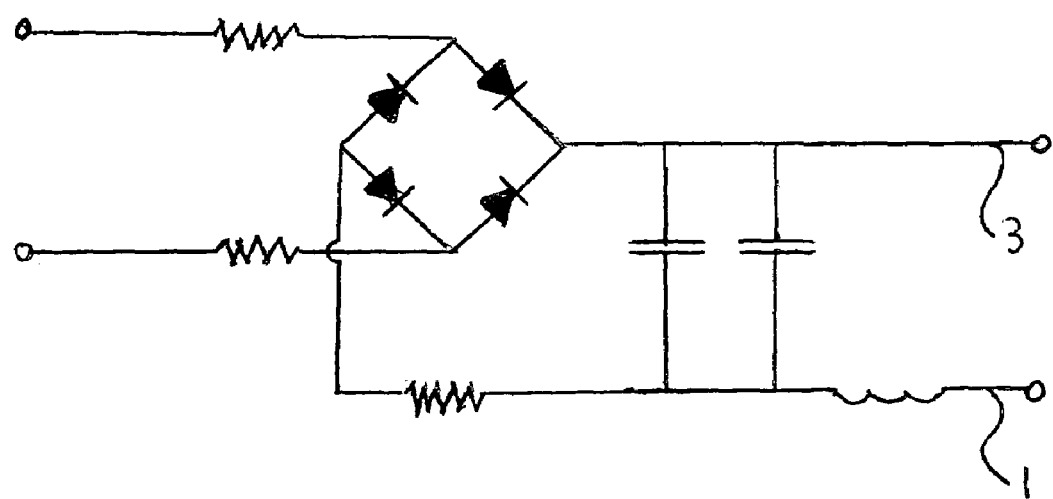
FIG. 2 is a schematic diagram of a power supply.

FIG. 1 is a schematic diagram of a coherent light-generating device. The process begins with the power supply of FIG. 2, which converts alternating current into direct current. The negative lead 1 of the power supply of FIG. 2 is connected to the positive lead 2 of the charging plate of the of the four-lead capacitor of FIG. 3. The positive lead 3 of said power supply is connected to the negative lead 4 of said four-lead capacitor.

Figure 4A:
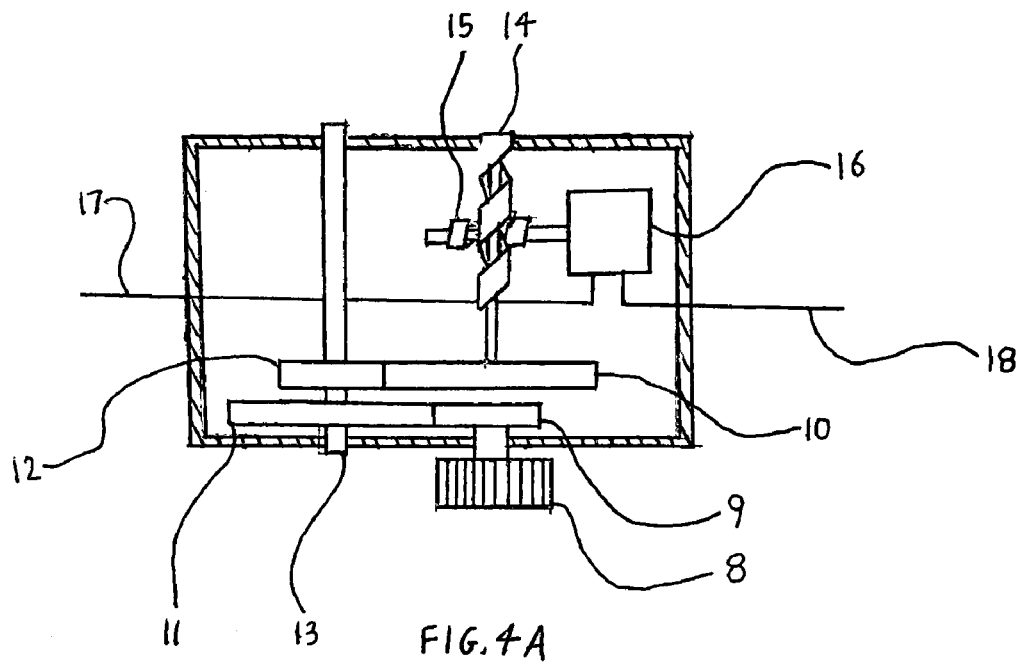
FIG. 4A is a sectioned view of the variable resistive device.
Figure 4:
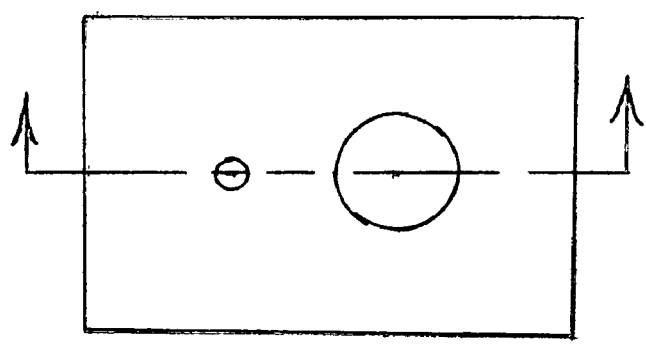
FIG. 4 is a perspective representation of a variable resistive device consisting of a knob and gears, which rotate the shaft of a variable resister.

FIG. 3A is a sectioned view of the four-lead capacitor. The four-lead capacitor consists of a positive plate 5 with two adjoined leads, a dielectric 6 and a negative plate 7 with two adjoined leads. The negative lead 26 of the charging plate is connected to the positive lead 18 of the variable resistive device of FIG. 4. FIG. 4A is a sectioned topographical view of the variable resistive device which consist of a tunable knob 8, four wheel gears 9,10,11,12, a pin 13, two worm gears 14, 15, a rheostat 16 in series with a positive lead 17 and a negative lead 18. The negative lead of the variable resistive device is adjoined to the cathode wire of the vacuumed bulb.

Figure 5:
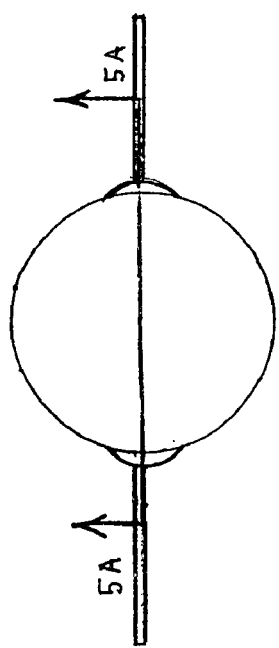
FIG. 5 is a perspective representation of a vacuumed bulb.
Figure 5A:
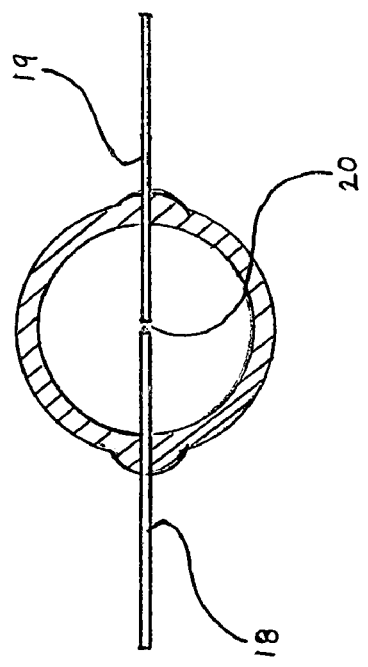
FIG. 5A is a sectioned view of the vacuumed bulb.
Figure 6:
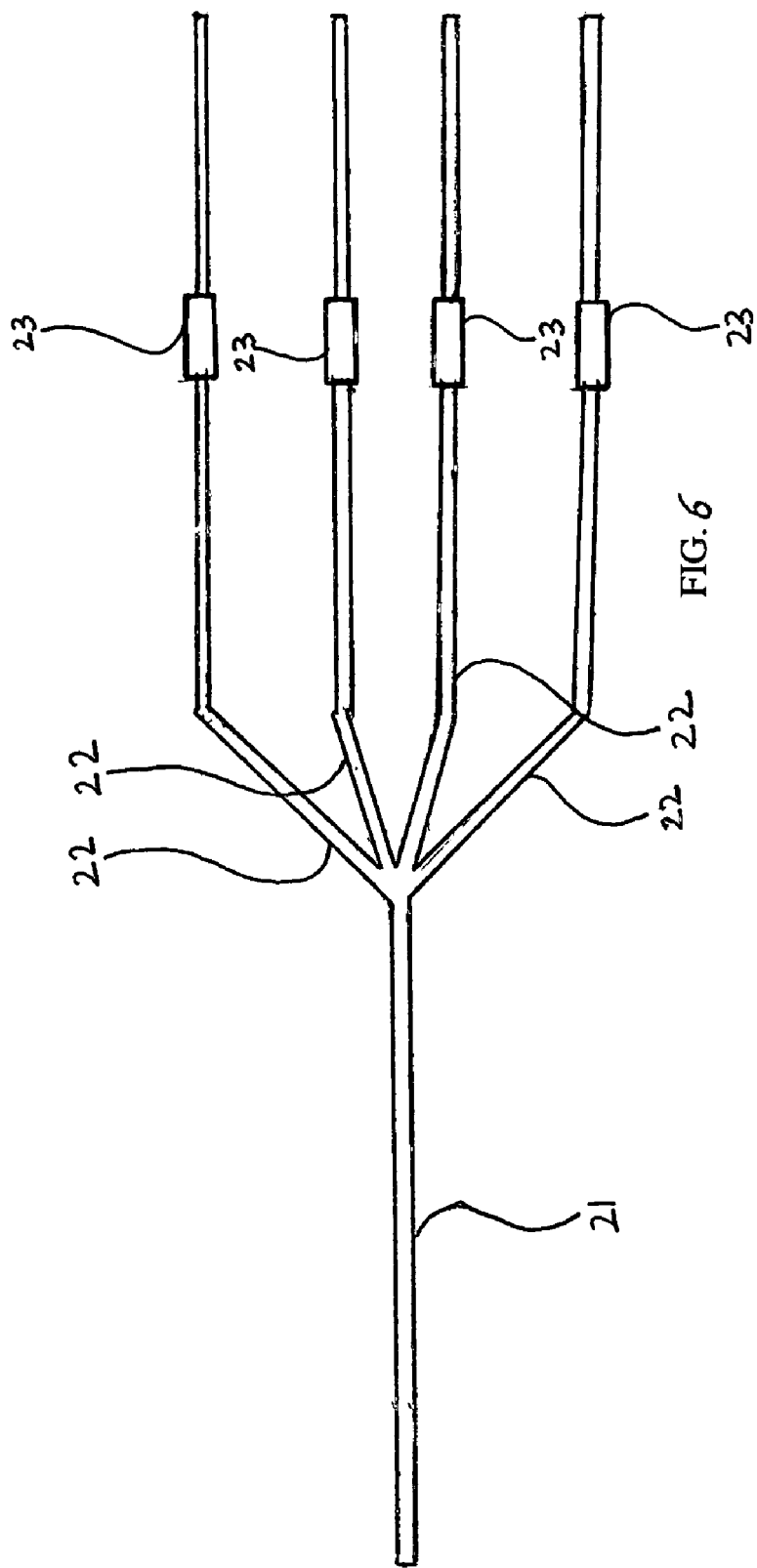
FIG. 6 is a perspective representation of a conductive wire which splits into four conductive wires with forward biasing diodes on each end.
Figure 6A:
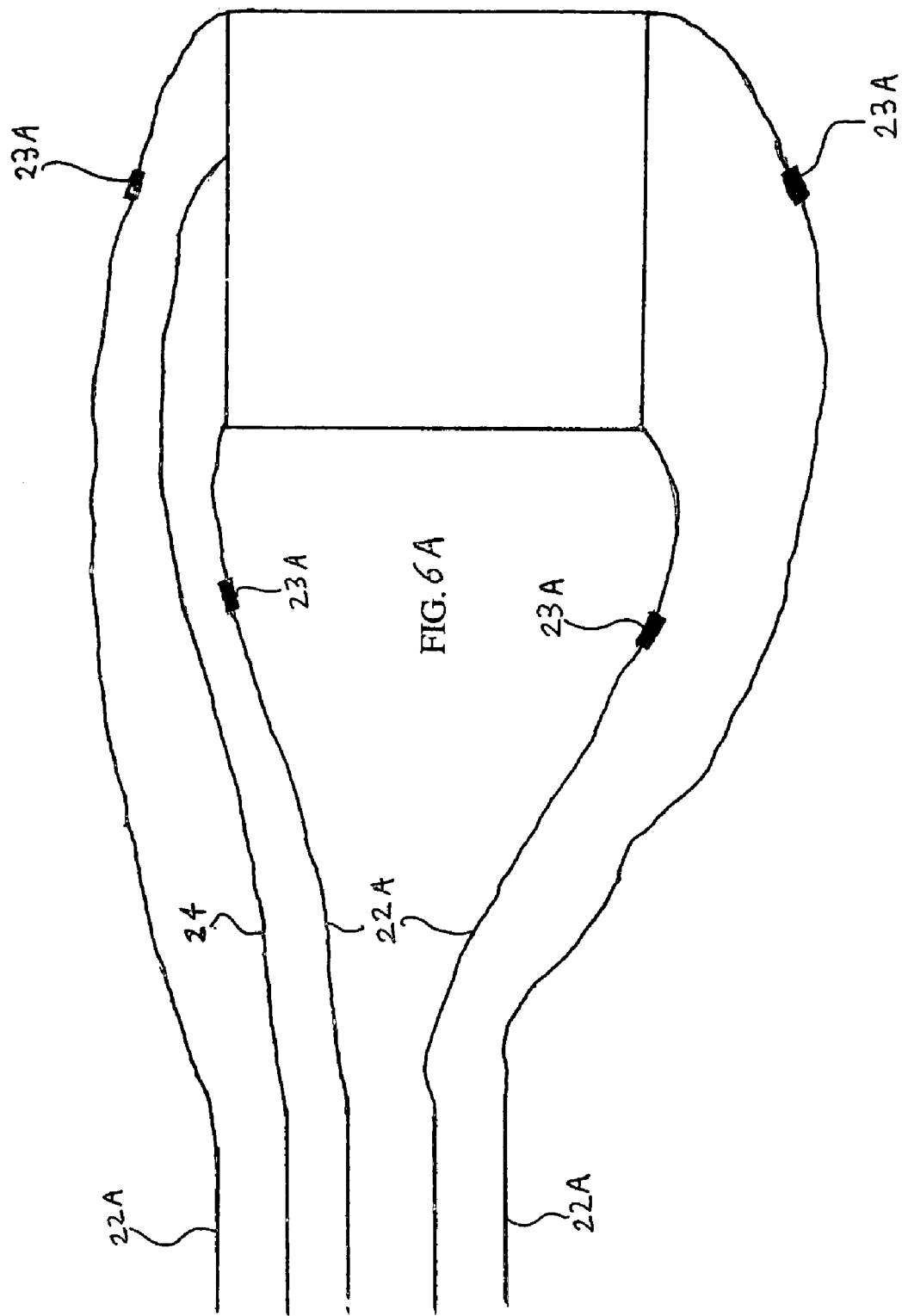

FIG. 5 is the vacuumed bulb, a hollow, gasless sphere of material. FIG. 5A is the sectioned view of the vacuumed bulb with a cathode wire 18 through one end of the bulb, and an anode wire 19 through the end opposite of the cathode wire of the bulb. The cathode and anode converge, leaving a minute gap 20 between them. In FIG. 6, a conductive wire 21 is adjoined to the anode 19 of the vacuumed bulb. The conductive wire 21 is split into four conductive wires 22 of equal guage. Each conductive wire of 22 is adjoined to a PN diode 23. In FIG. 6A, the conductive wires of 22A with the PN diodes of 23A are thoroughly adjoined to the corners of a thin metal square or antenna. One relief conductive wire 24 for the electrons is adjoined to a side of the antenna and is connected to the positive lead 27 of the four-lead capacitor.

FIG. 7 is a frontal view of a hollow cube of stiff construction with a mirror 25 placed on both sides of the internal open space. The reflective surfaces of the two mirrors are at a 90 degree angle. The four conductive wires with adjoined diodes and the antenna, FIG. 6B are assembled with the relief conductive wire 24A inside the hollow cube.

FIG. 7A is a sectioned, topographical view of the hollow cube of stiff construction. The two mirrors 25A are on both sides of the antenna, FIG. 6C.

That which is claimed is:

1. A coherent light generator comprising:
   a power supply for converting alternating current into direct current, the power supply having positive and negative output poles;
   a four lead capacitor having first and second electrical conductors connected to a positive plate of the capacitor and third and fourth electrical conductors connected to the negative plate of the capacitor, the first conductor connected to the positive output pole of the power supply and the third conductor connected to the negative output pole of the power supply;
   a variable resistor connected between ground and the fourth conductor of the four lead capacitor;
   a vacuum bulb, the vacuum bulb comprising a hollow sphere surrounding a cathode and an anode, a cathode conductor extending from the cathode to a point outside of the sphere and an anode conductor extending from the anode to a point outside of the sphere, the cathode and anode defining a gap within the vacuum bulb, the cathode conductor connected to the variable resistor; and
   a thin square metal plate having four corners, each of the four corners electrically connected to anode conductor of the vacuum bulb, the metal plate further electrically connected to the second conductor of the four lead capacitor;
   wherein the thin metal plate provides an initial coherent light source for the coherent light generator.

2. The coherent light generator of claim 1 further comprising:
   an array of diodes electrically connected between the anode conductor of the vacuum bulb and the four corners of the thin metal plate, the array of diodes comprising at least four diodes, each connected with a conductor wire of equal gauge to one of the four corners of the thin metal plate, and each of which become forward biased as pulsing direct current passes from the vacuum bulb through the conductor wires into each of the diodes.

3. The coherent light generator of claim 1 further comprising:
   a hollow enclosure of rigid construction at least partially enclosing the square metal plate, the square metal plate positioned within the hollow enclosure generally perpendicular to an open side of the hollow enclosure; and
   first and second mirrors, each of the mirrors positioned at a 45° angle from a face of the thin square metal plate, one mirror on each side of the metal plate, wherein each of the mirrors reflect coherent light generated from the thin square metal plate through the open side of the hollow enclosure.

4. A coherent light generator comprising:
   a power supply for converting alternating current into direct current, the power supply having positive and negative output poles;
   a four lead capacitor having first and second electrical conductors connected to a positive plate of the capacitor and third and fourth electrical conductors connected to the negative plate of the capacitor, the first conductor connected to the positive output pole of the power supply and the third conductor connected to the negative output pole of the power supply;
   a variable resistor connected between ground and the fourth conductor of the four lead capacitor;
   a vacuum bulb, the vacuum bulb comprising a hollow sphere surrounding a cathode and an anode, a cathode conductor extending from the cathode to a point outside of the sphere and an anode conductor extending from the anode to a point outside of the sphere, the cathode and anode defining a gap within the vacuum bulb, the cathode conductor connected to the variable resistor;
   an array of diodes electrically connected to the anode conductor of the vacuum bulb, the array of diodes comprising at least four diodes, each connected with a conductor wire of equal gauge, and each of which become forward biased as pulsing direct current passes from the vacuum bulb through the conductor wires into each of the diodes;

a thin square metal plate having four corners, each of the four corners electrically connected to one of the at least four diodes, the metal plate further electrically connected to the second conductor of the four lead capacitor;

a hollow enclosure of rigid construction at least partially enclosing the square metal plate, the square metal plate positioned within the hollow enclosure generally perpendicular to an open side of the hollow enclosure; and first and second mirrors, each of the mirrors positioned at a 45° angle from a face of the thin square metal plate, one mirror on each side of the metal plate, wherein each of the mirrors reflect coherent light generated from the thin square metal plate through the open side of the hollow enclosure.

\* \* \* \* \*